United States Patent [19]
Meyers et al.

[11] 3,925,947
[45] Dec. 16, 1975

[54] AUTOMOBILE WINDOW SEALING

[75] Inventors: Robert M. Meyers, Fairless Hills, Pa.; Edward F. Kutch, Trenton; Matthew M. Sitter, Convent Station, both of N.J.

[73] Assignee: Novagard Corporation, Trenton, N.J.

[22] Filed: Jan. 25, 1974

[21] Appl. No.: 436,451

Related U.S. Application Data
[63] Continuation of Ser. No. 266,076, June 26, 1972.

[52] U.S. Cl. .................... 52/208; 52/397; 52/403
[51] Int. Cl.² ..................... E04B 1/62; E06B 3/00
[58] Field of Search ............ 52/403, 396, 397, 208

[56] References Cited
UNITED STATES PATENTS

| | | |
|---|---|---|
| 3,016,993 | 1/1962 | Owen .................................. 52/397 |
| 3,155,204 | 11/1964 | Campbell et al. ..................... 52/397 |
| 3,387,416 | 6/1968 | Martin ................................ 52/397 |
| 3,478,475 | 11/1969 | Strack ................................ 52/208 |
| 3,652,380 | 3/1972 | Strack ................................ 52/397 |

*Primary Examiner*—James L. Ridgill, Jr.
*Attorney, Agent, or Firm*—Sperry and Zoda

[57] ABSTRACT

The windows of a motor vehicle are sealed and held in place between a pinch weld and trim strip on the vehicle using a hot melt elastomeric sealing composition which adheres tenaciously to the glass and metal parts without the application of a priming coat or the use of compression members. The hot melt composition consists of an intimate mixture of an elastomeric polymer, tackifying and plasticizing resins, and from about 0.2 to 12% of adhesion promoters together with fillers and other additives.

11 Claims, 1 Drawing Figure

U.S. Patent    Dec. 16, 1975    3,925,947
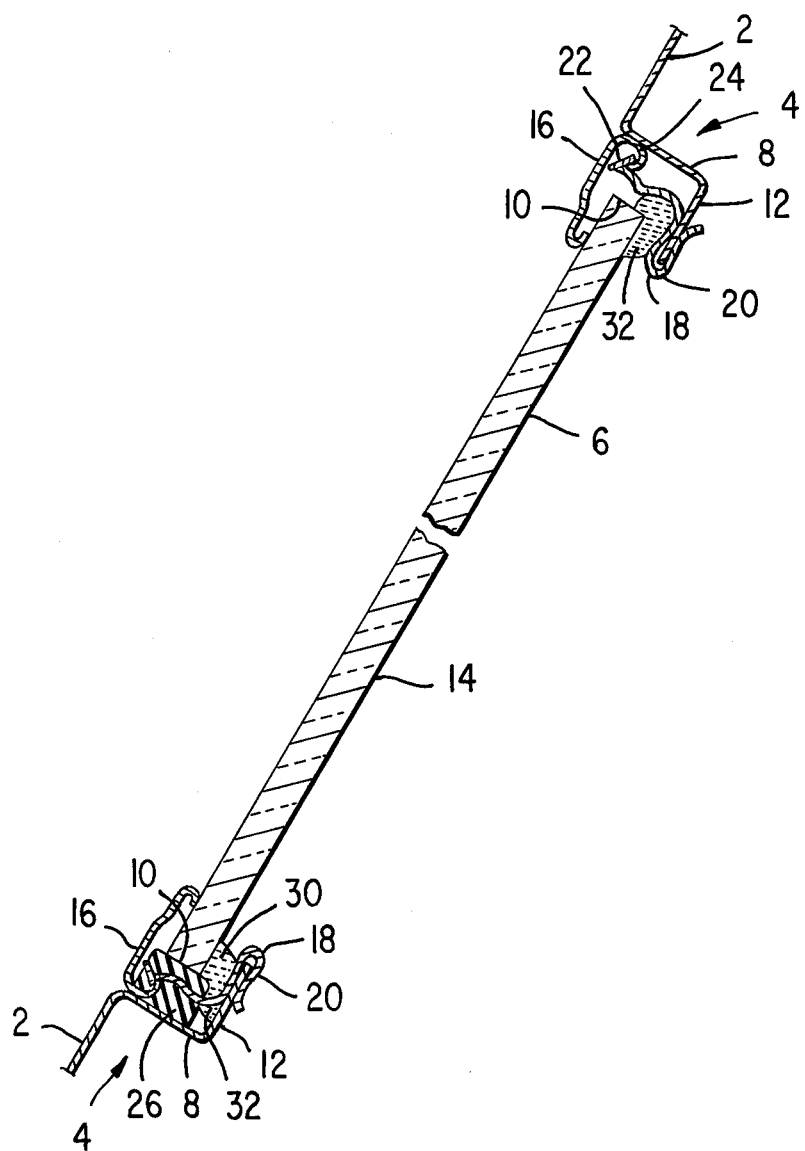

AUTOMOBILE WINDOW SEALING

This application is a continuation of applicant's copending application Ser. No. 266,076 filed June 26, 1972.

FIELD OF INVENTION

The windshield and the rear window or "back light" installed in motor vehicles are generally held in place by means of a metal trim strip and a pinch weld and in some cases a rubber dam or strip is also applied to close the space between the pinch weld, trim strip and glass. Sealant in the form of preformed ropes or tapes formed of curable polysulfide or urethane compositions have heretofore been applied to the glass and pinch weld to prevent leakage of rain or water into the vehicle about the edges of the glass and between the elements of the assembly. Rubber spacer members are usually placed in the pinch weld before the glass is inserted so as to be engaged by the edges of the glass to center the glass in the opening during the assembly operation, as exemplified by U.S. Pat. Nos. 3,155,204 and 3,478,475. See also U.S. Pat. No. 3,527,663 wherein a preformed strip of sealant having a heating element embedded therein is heated after application to cure the sealant in place and U.S. Pat. No. 3,654,005 which is also cured in place.

As a result of the intense and continued vibration to which the windshield and back light of an automobile may be subjected and the force with which wind and rain may be driven against the windshield of a car driven at a high speed, those compositions used in sealing the stationary windows in buildings and elsewhere are not suitable for use in automobiles. Moreover, when a sealant in the form of a rope or tape is used it has heretofore been necessary to apply a layer of priming material to the surface of the metal and glass and even then it is often necessary to maintain the sealant under pressure in order to assure the intimate and continuous sealing contact required to prevent leakage about the windshield.

The sealants used in automobiles further must possess sufficient internal strength or cohesion to prevent them from rupturing or pulling apart in use due to vibration or change in their physical properties as a result of chemical reaction. It is therefore usual to subject the sealants to be used to a "Peel Adhesion" Test before it will be approved for use in pinch weld. Such tests are carried out by applying a sample of the sealant material to glass and to metal and pressing a layer of airoplane cloth over the sealant. The sample is allowed to stand for 7 days at 73°F after which the airoplane cloth is pulled off the sealant at 180° at the rate of 2 inches per minute using a Scott Tester to measure the force applied on pounds per linear inch (pli). The test is repeated after the sample has been immersed in water for 7 days and 30 days and then tested in accordance with Federal Specification No. TTS–00230. This test requires the material to register at least 5 pli and no more than 25 percent adhesion loss to the substrate (glass or metal) in any test.

In accordance with the present invention a novel type of sealant for motor vehicle windows and the like is provided which meets all these requirements without the application of a primer coat to either the metal or the glass. The sealant is a "hot melt" elastomeric composition that is sufficiently fluid at temperatures of from about 150°F to 400°F to permit it to be readily applied by a heated gun or the like but hardens promptly on cooling. However, it possesses characteristic elasticity and adhesion properties and does not undergo appreciable change in its properties after application or upon exposure to water, air oils, polishes or prolonged climatic conditions. As a result upon application to the glass and metal of an automobile's window assembly in a heated, fluid condition an intimate liquid-type contact is established and use of the primer coat heretofore required in the installation of automobile windows is eliminated. Nevertheless, upon cooling, an enduring permanent seal is provided. The assembly steps therefore can be carried out quickly and easily and the operation of applying the priming material can be eliminated altogether.

In these respects the sealants of the present invention differ fundamentally from compositions of the prior art. Thus so called hot melt adhesives used in the bonding of paperboard and the like are thomoplastic while in a molten state and set quickly upon cooling but they are often hard and lack elasticity and the cohesive strength required in automobile window assemblies. On the other hand those elastomeric sealants such as the one or two part polysulfide and urethane compositions which possess desirable adhesive and weathering characteristic require prolonged curing periods of several hours or days to properly mature or react and frequently must be carefully mixed and prepared prior to application and use.

In contrast with such prior compositions the hot melt elastomeric sealants of the present invention are capable of being readily produced and shipped in a condition for immediate use without further mixing or curing so that when heated to temperatures of 150°F to 400°F they can be extruded and applied directly as required by means of a heated gun or the like. Thereafter upon cooling they possess characteristic elasticity and cohesive strength and bond tenaciously to glass and metal without any delay for curing or chemical interaction. Moreover, they are highly resistant to weather conditions and widely varying temperatures to which they may be exposed.

THE DRAWING

The FIGURE of the drawing is a diagrammatic vertical sectional view through a typical windshield assembly embodying the present invention.

PREFERRED EMBODIMENT OF THE PRESENT INVENTION

In that form of the invention chosen for purposes of illustration in the drawing the body 2 of the vehicle is provided with a pinch weld 4 about the window opening for receiving the windshield glass 6. The pinch weld presents an inwardly turned ledge or sealing portion 8 which extends parallel with the outer edges 10 of the glass 6 and has a marginal retaining flange 12 extending generally parallel to the inner surface 14 of the windshield. Trim strips 16 are applied about the edges of the glass by clips 18 or the like to close and conceal the pinch weld 4. The clips 18 shown have inner return bend portions 20 engageable with the flange 12 of the pinch weld and are provided with projections 22 engageable with inturned portions 24 of the trim strips 16 to hold the strips in place. Rubber setting blocks 26 or the like are inserted between the outer edges 10 of the glass and the ledge 8 of the pinch weld 4 to hold the glass 6 in a fixed position within the window opening during the assembly operation. A foam rubber dam 30 may also be applied to the assembly between the flange 12 of the pinch weld 4 and the glass 6 to provide a finished neat appearance to the assembly.

In accordance with the present invention the sealant 32 employed is of a hot-melt elastomeric type adapted to be applied to the glass while in a heated condition by means of a heated caulking gun or the like. The sealant is preferably applied to the glass before it is placed in position and is thereafter moved into place so that the sealant will contact the pinch weld while still heated. The sealant has a composition such that it will adhere tenaciously to the glass and metal of the pinch weld and other surfaces it engages without requiring the application of a layer of priming material to the glass or metal. Moreover, the fluid character of the sealant when applied establishes an intimate contact with such surfaces and any irregularities therein whereas the sealant solidifies rapidly on cooling so that the assembly operation can be speeded up and need not be delayed to allow time for curing, setting or interaction of the constituents thereof or evaporation of solvents therefrom.

The composition of the sealant employed can be varied considerably but in general the sealants consist of intimate mechanical mixtures or blends of elastomeric polymers with tackifying and plasticizing resins and adhesion promoters to which fillers and the like are added. They are soft and sufficiently fluid to be applied by means of a heated caulking gun at temperatures of about 150° to 400°F but on cooling have a hardness in the range of about 20 to 95 on a Shore A Durometer.

Typical compositions contain from about 10 to 200 parts by weight of elastomeric polymers having a molecular weight of about 15,000 up to 200,000 or 300,000 or more; about 1 to 200 parts by weight of tackifying resins; from about 10 to 400 parts by weight of plasticizer; from about 0.5 to 60 parts by weight of adhesion promoters, and from about 5 to 500 parts by weight of filler material.

Among the elastomeric polymers which may be used and the trade names by which they are sometimes identified are, butyl rubbers, such as the copolymers of isobutylene and isoprene (Ex 214 and PB201) polyiosbutylene (Vistenex LMMMH); butadiene-styrene (Buna-S), styrene-butadiene-styrene polymers (GRS and Kraton SBS) styrene-isoprene polymers (Kraton 1102) chlorinated rubbers (Parlon S125); acrylic rubber (Thiocryl); urethane polyester rubbers (Elastothane 455) and solid polysulfide polymers (Thiokol FA and ST).

Among the tackifying resins preferred are terpene resins (Piccohesive 125); polyterpene resins (Wing Tack 95 and Foral 105); phenolic resins (SP559 and Super Beckocite 2000); hydrogenated resin (Stabilite ester 10); and hydrocarbon resins (Nevillac 10 and ERJ 683). Typical plasticizers are polybutenes (Indopol 1900 and H-100); polyisobutylene (Vistonex LMMS); phosphate esters (Santicizer 148); dibutyl phthalate; plasticizers (TP90B, ZP 680), parafine oiles (Sun Par 2100); chlorinated paraffin (Kloro 6500); benzoic acid esters of polyalkylene glycols, coal tars and asphalts. Chlorinated polyphenyl (Aroclor 5460) and chlorinated biphenyl (Aroclor 1254) may be used for both their tackifying and plasticizing properties.

Typical adhesion promoters are solid epoxy resins having an epoxide equivalent of from 150 to 3000 such as the resins sold by Shell Chemical Company under the names Epon 1002, 1007 and 828. Among the silanes employed are those sold by Union Carbide Corporation and identified as A-186, A-187, A-1100, A-153, and A-151. Other adhesion promoters which may be used are polyurethane resins such as Solithane 291 (a polyester type) and Gurardthane 72 (a polyether type), ethylene vinyl acetate sold by Union Carbide under the designation EVA and the liquid phenolic resin known as Methylon 75108.

Typical fillers and pigments which may be used are carbon blacks, calcium carbonate, Mica, rayon flock, bentonite, barium sulphate, mineral fillers, graphite, talc, titanium dioxide, asbestos clay, silica, wood flour, and the like.

In order to assure the necessary adhesion characteristics to comply with the "Peel/Adhesion Tests" required in automobile window assemblies, from about 0.2 to 12 percent by weight of the sealant composition should consist of adhesion promoters. While such adhesion promoters may consist of a silane alone or an epoxy composition alone, it has been found preferable to use silanes and epoxy compositions in combination. Thus, preferred sealant materials contain from about 0.2 to 1.5 percent by weight of a silane together with from about 0.5 to 10 percent of an epoxy compound depending upon the nature and type of the adhesion promoter used. The use of greater amounts of adhesion promoters is not precluded but does not appear to be advantageous.

In order to attain the requisite cohesion properties in the sealant for use in automobile window assemblies and at the same time provide the hot melt characteristics assuring fluidity at temperatures above about 150°F and ease in application thereof by means of a heated caulking gun, the amount of the tackifying resin contained in the composition should constitute from about 8 to 30 percent by weight of the product and preferably is in the range of about 10 to 20 percent thereof.

In producing the compositions the constituents are intimately mixed and blended in a mill such as a Baker-Perkins Sigma Blade Mixer. Ordinarily, the elastomer and tackifying resin are introduced first and when well blended the adhesion promoter and at least part of the filler is added and the plasticizer then introduced as the mixing operation is continued. The blending is effected by the shearing action of the mill and generally is carried out for about 30 to 60 minutes during which time the temperature rises to about 100° to 140°F, and preferably is kept below about 250°F.

When the elastomeric polymers used are Thiokol products such as the solid gum elastomers identified as FA and ST, they preferably are allowed to swell and soften by soaking in chlorinated biphenyl (Aroclor 1254) or dibutyl phthalate for some time before being introduced into the blender.

In order to illustrate typical sealant compositions which may be employed the following examples are cited:

| Composition | A | B |
|---|---|---|
| EX 214 | 100 | 100 |
| Wing Tack 95 | 50 | — |
| Super Beckocite 2000 | — | 50 |
| Epon 1007 | 10 | 10 |
| Silane A 186 | 2.0 | 1.0 |
| Indopol H 100 | 50 | 60 |
| Indopol 1900 | 50 | 40 |
| Super Multifex | 55 | 60 |
| Statex RH | 45 | 30 |
| Stearic Acid | 2.0 | 2.0 |

-continued

| Composition | A | B |
|---|---|---|
| Hardness, Shore A | 33 | 35 |

| Composition | A | B |
|---|---|---|
| FA or ST | 100 | 100 |
| Dibutyl Phthalate | 30 | 50 |
| Wing Tack 95 | 25 | — |
| Aroclor 5460 | — | 50 |
| Epon 1004 | 10 | 10 |
| Silane A 187 | 2.0 | 1.0 |
| Sun Par 2100 | — | — |
| Indopol H 100 | — | — |
| Indopol 1900 | — | — |
| Super Multifex | 50 | 50 |
| Sterling R | 20 | 20 |
| Stearic Acid | 2.0 | 2.0 |
| Hardness, Shore A | 31 | 28 |

| Composition | E |
|---|---|
| Elastothane 455 | 100 |
| TP 95 or 90B | 25 |
| ZP 680 (polymeric) | 30 |
| Aroclor 5460 | 50 |
| A 151 | 2.0 |
| Super Multifex | 80 |
| Sterling R | 20 |
| Hardness, Shore A | 30 |

| Composition | F |
|---|---|
| Kraton 1102 | 100 |
| Floral 105 | 50 |
| Stearic Acid | 2.0 |
| Epon 1004 | 10 |
| Silane A 186 | 1.0 |
| Super Multifex | 60 |
| Sterling R | 20 |
| Indopol H 100 | 40 |
| Indopol 1900 | 30 |
| Harness, Shore A | 25 |

All of the foregoing compositions were sufficiently fluid at a temperature of 300°–350°F to permit them to be applied by a hot melt applicator of the type known as a "Possis Model 1015" sold by Possis Machine Corporation and served to establish an unbroken liquid type seal between the sealant composition and both the glass and the metal of the pinch weld in an automobile.

In order to demonstrate the effectiveness of the seal produced and the characteristic properties imparted to the compositions of the present invention resulting from the presence of adhesion promoters therein, the compositions A, B and C above were compared with the identical compositions from which the adhesive promoters (Epon 1007, Silane A 186, Epon 1004 and Silane A 187) were omitted. These compositions were subjected to the Peel/adhesion Test of Federal Specification TTS–00230 upon application to glass without the application of a primer to the glass. The results obtained are indicated in the following table wherein the numbers indicate the pounds per linear inch registered on the Scott Tester when cohesion failure took place upon separation of the jaws of the equipment at the rate of 2 inches per minute. The term "cohesive failure" as thus used refers to the internal rupturing of the sealant whereby a substantial portion of the sealant adheres to the surface of each substrate.

The values $a$ above indicated 100 percent cohesive failure, $b$ represents 50 to 60 percent cohesive failure, $c$ indicates 25 to 40 percent cohesive failure and $d$ represents 0 percent cohesive failure.

The samples A, B and C from which the adhesion promoter was omitted not only exhibited markely reduced cohesion properties after immersion in water but also resulted in complete adhesion failure between the sealant and the glass after 7 days immersion in water. Similar results were obtained when the tests were conducted with the sealant applied to metal surfaces.

It is generally considered that a value of 5 pli or more is required in the foregoing tests for any sealant to be satisfactory for use on even stationary window installations whereas a value of 10 pli or more may be required for sealants to be used in the automobile industry.

It is therefore apparent that the compositions of the present invention possess characteristic properties assuring effective sealing of the windshield and back light secured in place by the pinch weld of an automobile while eliminating the need for using a priming material and the operations necessary for its application.

In producing window assemblies in accordance with the present invention the form, construction and arrangement of the pinch weld, clip, trim strip and rubber dam strips employed may of course be varied considerably. In view thereof it should be understood that the embodiment of the invention shown in the drawing is intended to be illustrative only.

We claim:

1. An automobile window assembly comprising a pinch weld member surrounding the opening in which the window is to be located and presenting an outwardly facing surface, a pane of glass closing said opening and supported about its edges by the outwardly facing surface of said pinch weld member, there being a hot melt elastomeric sealing composition disposed between said edges of said pane of glass and the outwardly facing surface of said pinch weld member throughout the entire periphery of the pane of glass, said sealant composition being characterized by the fact that it is fluid at a temperature above about 150°F so that upon contact thereof with the surface of the glass and pinch weld member while at such temperature it will establish a fluid-type contact with both the glass and pinch weld member, said sealing composition consisting essentially of a nonreactant mechanical mixture of from about 10 to 200 parts by weight of an elastomeric polymer, from about 1 to 200 parts by weight of tackifying resins, from about 10 to 400 parts by weight of plasticizer, from about 0.5 to 60 parts by weight of one or more adhesion promoters, and from about 5 to 500 parts by weight of inert filler, said sealing composition further being characterized by the fact that upon cooling to atmospheric temperature, it will have a hardness of from about 20 to 95 on a Shore A Durometer.

| | PEEL ADHESION, LBS. PER LINEAR INCH | | | | | |
|---|---|---|---|---|---|---|
| | WITH Adhesion Promoter | | | OMITTED Adhesion Promoter | | |
| | A | B | C | A | B | C |
| 7 days at 73°F | 12a | 11a | 13a | 10a | 10a | 10a |
| 7 days in water | 13a | 11a | 14a | 9b | 7.5b | 9.5b |
| 30 days in water | 13a | 12a | 14a | 5c | 2d | 7c |